US012764117B2

(12) United States Patent
Gandhi et al.

(10) Patent No.: US 12,764,117 B2
(45) Date of Patent: Oct. 13, 2026

(54) METHODS FOR IDENTIFICATION OF A DEVICE USER BASED ON A USER-RELATED METRICS ANALYSIS AND SYSTEMS THEREOF

(71) Applicant: F5, Inc., Seattle, WA (US)

(72) Inventors: Kushal Gandhi, Bhavnagar (IN); Jitendra Alekar, Indore (IN); Arpit Pradhan, Fremont, CA (US)

(73) Assignee: F5, Inc., Seattle, WA (US)

( * ) Notice: Subject to any disclaimer, the term of this patent is extended or adjusted under 35 U.S.C. 154(b) by 147 days.

(21) Appl. No.: 18/373,731

(22) Filed: Sep. 27, 2023

(65) Prior Publication Data

US 2025/0106216 A1 Mar. 27, 2025

(51) Int. Cl.
*H04L 9/40* (2022.01)

(52) U.S. Cl.
CPC ........ *H04L 63/102* (2013.01); *H04L 63/1425* (2013.01)

(58) Field of Classification Search
CPC ..... H04W 12/30; H04W 12/065; G06F 21/36; G06F 16/252; G06F 21/40; G06Q 20/322; G06Q 50/01; H04L 63/083; H04L 63/0861; H04L 63/1408; G06V 40/172
See application file for complete search history.

(56) References Cited

U.S. PATENT DOCUMENTS 9,407,754 B1 * 8/2016 Benoit .................. H04W 12/30
9,426,139 B1 8/2016 Mcclintock
11,277,437 B1 * 3/2022 Burgis ................ H04L 63/1408
11,361,062 B1 * 6/2022 Ogrinz .................... G06F 21/40
2014/0317263 A1 10/2014 Abuelsaad et al.
2014/0337243 A1 * 11/2014 Dutt ..................... G06Q 20/322 705/325
2016/0063503 A1 * 3/2016 Kobres ................ G06V 40/172 705/18
2016/0219046 A1 * 7/2016 Ballard ............... H04L 63/0861
(Continued)

OTHER PUBLICATIONS

European Search Report. European Patent Application No. 24202485.9. Dated Jan. 20, 2025.
(Continued)

*Primary Examiner* — Dustin Nguyen
(74) *Attorney, Agent, or Firm* — Troutman Pepper Locke LLP

(57) ABSTRACT

Methods, network traffic management devices, non-transitory computer readable media, and network traffic management systems that identify a device user based on a user-related metrics analysis include retrieving, in response to a received request requiring identification of a user at a client, user profile data associated with a user. A user confidence score is calculated based on a determined baseline user profile score for the user based on prior values associated with metrics in categories obtained from the retrieved user profile data and a determined current user profile score for the user based on current values associated with metrics in categories obtained from the retrieved user profile data. The calculated user confidence score is compared against a stored threshold range comprising minimum and maximum threshold scores. An action with respect to the user is executed in response to the request based on the comparison.

20 Claims, 5 Drawing Sheets

(56) References Cited

U.S. PATENT DOCUMENTS

| | | | | |
|---|---|---|---|---|
| 2016/0239649 | A1* | 8/2016 | Zhao | H04W 12/065 |
| 2017/0041145 | A1* | 2/2017 | Sinchak | H04L 63/083 |
| 2017/0075894 | A1* | 3/2017 | Poornachandran | G06Q 50/01 |
| 2019/0384898 | A1* | 12/2019 | Chen | G06F 21/36 |
| 2021/0076212 | A1* | 3/2021 | Manikantan Shila | H04W 12/065 |
| 2021/0406713 | A1* | 12/2021 | Chauhan | G06F 16/252 |

OTHER PUBLICATIONS

Lefyer, Kirill & Spivak, Anton, (2017). Method of person identification based on biometric characteristics of touch screen gestures. Proceedings of the 20th Conference of Open Innovations Association FRUCT. 776. 222-227. 10.23919/FRUCT.2017.8071315.

Rahman, et al. (2015). Automated Person Identification System Using Walking Pattern Biometrics. International Journal of Scientific & Engineering Research, vol. 6, Issue 9, Sep. 2015; ISSN 2229-5518.

Andre' Ferraz's (@Andre' F.) Linkedin https://www.linkedin.com/posts/andreferraz_fraudfarm-fraudfarms-fraudfighters-activity-6995467582543720448-SUCI?utm_source=share&utm_medium=member_desktop (last visited Sep. 21, 2023).

* cited by examiner

| Category | Metrics | Short form | Weight | Individual Weights | Value | Remarks |
|---|---|---|---|---|---|---|
| **Human (Headless)** | **Step Sound** | SS | $W_1$ | $W_A$ | $V_A$ | The metrics having higher sensitivity towards inference have been assigned high weight |
| | **Breathing Sound** | BS | | $W_B$ | $V_B$ | |
| | **Heart rate** | HR | | $W_C$ | $V_C$ | |
| | **Calories count** | CC | | $W_D$ | $V_D$ | |
| | **Stride Length** | SL | | $W_E$ | $V_E$ | |
| | **Velocity** | V | | $W_F$ | $V_F$ | |
| | **Step count** | SC | | $W_G$ | $V_G$ | |
| **Human Touch (Head)** | **Swipe velocity** | SV | $W_2$ | $W_H$ | $V_H$ | |
| | **Touch force** | TF | | $W_I$ | $V_I$ | |
| | **Touch event duration** | TD | | $W_J$ | $V_J$ | |
| | **Touch point area** | TA | | $W_K$ | $V_K$ | |
| | **Touch source** | TS | | $W_L$ | $V_L$ | |
| | **Typing pattern** | TP | | $W_M$ | $V_M$ | |
| | **Gesture Analysis** | GA | | $W_N$ | $V_N$ | |
| **Environment** | **Ambient Light** | AL | $W_3$ | $W_O$ | $V_O$ | |
| | **Air Temperature** | AT | | $W_P$ | $V_P$ | |
| | **Air Pressure** | AP | | $W_Q$ | $V_Q$ | |
| | **Humidity** | H | | $W_R$ | $V_R$ | |
| **Other** | **Gyroscope sensor** | GS | $W_4$ | $W_S$ | $V_S$ | |
| | **Proximity sensor** | PS | | $W_T$ | $V_T$ | |
| | **Barometer sensor** | BS | | $W_U$ | $V_U$ | |
| | **Camera Images** | CI | | $W_V$ | $V_V$ | |
| | **Accelerometer sensor** | AS | | $W_W$ | $V_W$ | |

FIG. 5

METHODS FOR IDENTIFICATION OF A DEVICE USER BASED ON A USER-RELATED METRICS ANALYSIS AND SYSTEMS THEREOF

This technology relates to methods and systems for identification of a device user based on a user-related metrics analysis, such as an analysis of user-related movement metrics or user's touchscreen interaction at a client device, to prevent fraudulent or wrong users from gaining access or to prevent a theft or a bot attack.

BACKGROUND

Before gaining access to applications or other resources at a server device, a client device will first need to be identified. This identification is used to prevent fraudulent or wrong users from gaining access and also to prevent theft or bot attacks. Typically, such identification has been performed by username and password-based authentication or by the use of biometric records. Although username and password-based authentication or use of biometric records are effective techniques for identification, other approaches are needed in view of the growing numbers of different types of devices seeking access to server devices and associated web applications and other resources.

SUMMARY

A method implemented by a network traffic management system including one or more server devices, host devices or client devices that retrieves, in response to a received request requiring identification of a client, user profile data associated with a user at the client. A user confidence score is calculated based on a determined baseline user profile score for the user at the client based on prior values associated with metrics in one or more categories obtained from the retrieved user profile data and a determined current user profile score for the user at the client based on current values associated with metrics in one or more categories obtained from the retrieved user profile data. The calculated user confidence score is compared against a stored threshold range comprising minimum and maximum confidence threshold scores. An action with respect to the user at the client is executed in response to the received request based on the comparison of the calculated user confidence score against the stored threshold range.

A network traffic management device includes a memory including programmed instructions stored thereon and one or more processors configured to be capable of executing the stored programmed instructions to retrieve, in response to a received request requiring identification of a client, user profile data associated with a user at the client. A user confidence score is calculated based on a determined baseline user profile score for the user at the client based on prior values associated with metrics in one or more categories obtained from the retrieved user profile data and a determined current user profile score for the user at the client based on current values associated with metrics in one or more categories obtained from the retrieved user profile data. The calculated user confidence score is compared against a stored threshold range comprising minimum and maximum confidence threshold scores. An action with respect to the user at the client is executed in response to the received request based on the comparison of the calculated user confidence score against the stored threshold range.

A non-transitory computer readable medium having stored thereon instructions for including executable code that, when executed by one or more processors, causes the processors to retrieve, in response to a received request requiring identification of a client, user profile data associated with a user at the client. A user confidence score is calculated based on a determined baseline user profile score for the user at the client based on prior values associated with metrics in one or more categories obtained from the retrieved user profile data and a determined current user profile score for the user at the client based on current values associated with metrics in one or more categories obtained from the retrieved user profile data. The calculated user confidence score is compared against a stored threshold range comprising minimum and maximum confidence threshold scores. An action with respect to the user at the client is executed in response to the received request based on the comparison of the calculated user confidence score against the stored threshold range.

A network traffic management system, comprising one or more server devices, network traffic management devices or client devices with memory comprising programmed instructions stored thereon, and one or more processors configured to be capable of executing the stored programmed instructions to retrieve, in response to a received request requiring identification of a client, user profile data associated with a user at the client. A user confidence score is calculated based on a determined baseline user profile score for the user at the client based on prior values associated with metrics in one or more categories obtained from the retrieved user profile data and a determined current user profile score for the user at the client based on current values associated with metrics in one or more categories obtained from the retrieved user profile data. The calculated user confidence score is compared against a stored threshold range comprising minimum and maximum confidence threshold scores. An action with respect to the user at the client is executed in response to the received request based on the comparison of the calculated user confidence score against the stored threshold range.

This technology provides a number of advantages including providing methods, non-transitory computer readable media, network traffic management devices, and network traffic management systems that more effectively and seamlessly identify a device user based on a user-related metrics analysis to manage further action. Examples of this technology create a user profile based on different metrics, such as a human non-touch-related metrics, human touch-related interactions, environment-related metrics, or device-related metrics, although other types and/or combinations of metrics may be used. Additionally, examples of this technology are able to effectively work with both head and headless devices. A head device is able to accept direct input from users by some form of interaction with an input mechanism, such as a touchscreen, by way of example, while a headless device lacks any direct input, such as a wearable band device which only has sensors and no touchscreen or other buttons for user interaction. Further, examples of this technology can be utilized in a variety of different applications, such as being able to identify users with a range of threshold confidence to: prevent theft or unauthorized privileged access to sensitive information; establish a confidence level in a sensitive transaction; identify an age or profile for parental sensitive contents control; and prevent bot attacks.

BRIEF DESCRIPTION OF THE DRAWINGS

FIG. 5 is an exemplary table of categories, metrics, weights, and values use in calculating a score for identifying a device user at a client.

Figure 1:
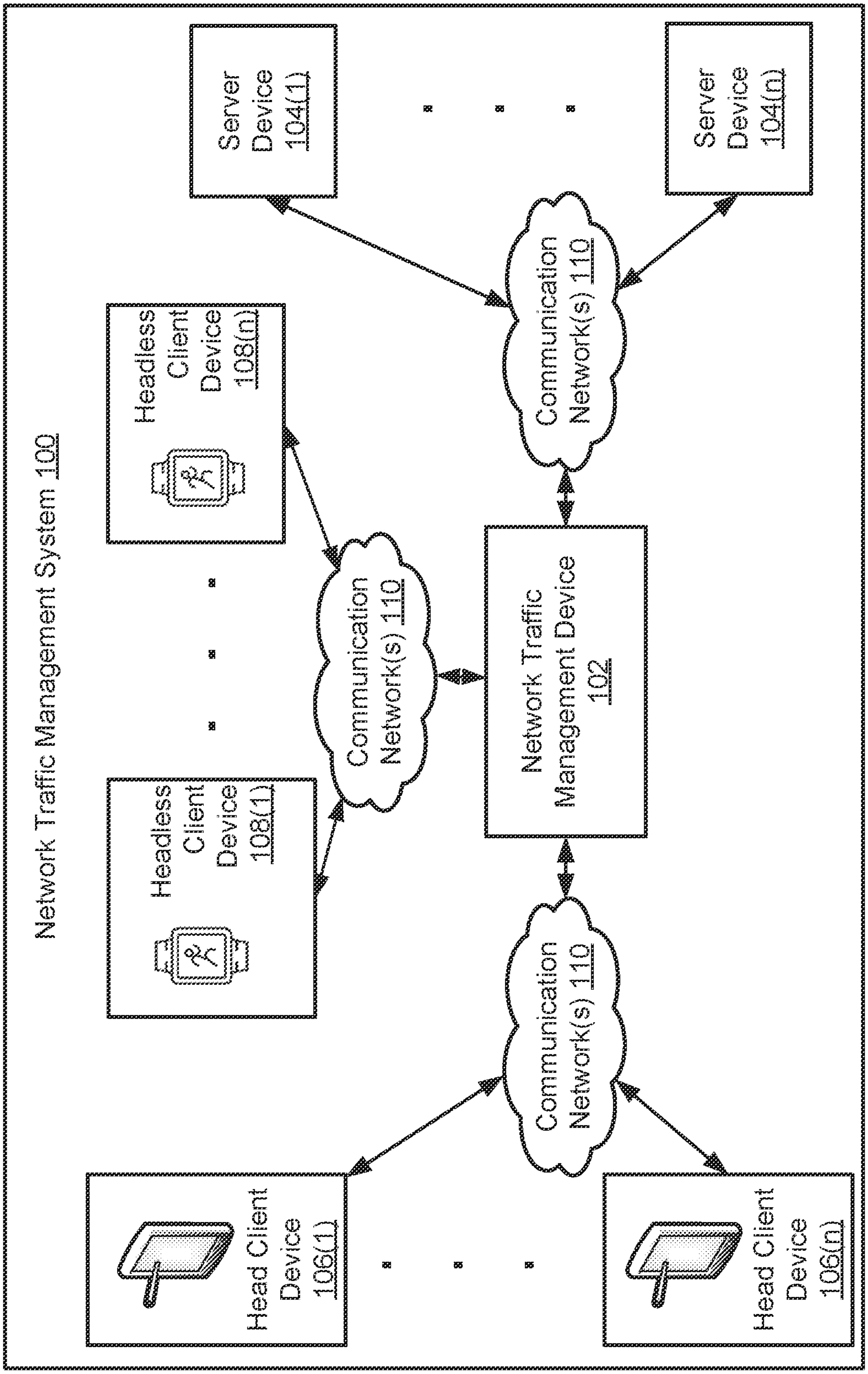
FIG. 1 is a block diagram of an exemplary network traffic management system with an exemplary network traffic management device configured to identify a device user at a client based on a user-related metrics analysis.

While each of the drawing figures illustrates a particular example for purposes of illustrating a clear example, other examples may omit, add to, reorder, or modify any of the elements shown in the drawing figures. For purposes of illustrating clear examples, one or more figures may be described with reference to one or more other figures, but using the particular arrangement illustrated in the one or more other figures is not required in the examples.

DETAILED DESCRIPTION

The examples of this technology may involve methods, non-transitory computer readable media, network traffic management devices, and network traffic management systems that identify a device user based on user profiled created from a user-related metrics analysis. Additionally, examples of this technology are able to effectively work with both head and headless devices. As described earlier, a head device is able to accept direct input from users by some form of interaction with an input device, such as a touchscreen by way of example, while a headless device lacks any direct input, such as a wearable band device which only has sensors and no touchscreen or other buttons for user interaction.

Examples of this technology can create a user profile based on different metrics in different categories, such as a human non-touch related category, a human touch related category, an environment-related category, and a device-related category, although other types of categories and/or metrics may be used. In response to a received request requiring identification of a client, this created user profile data associated with a particular user at the client can be retrieved. The user profile data may comprise values determined for different metrics in different categories associated with the user.

When user profile data for the particular user at the client has been retrieved, a user profile score for the user at the client is calculated based on values associated with metrics in one or more categories obtained from the retrieved user profile data. In this example, a composite score for the calculated user score is based on metric scores calculated for the values associated with the metrics in a combination of the categories. Additionally, the categories can comprise combinations of a human non-touch related category, a human touch related category, an environment-related category, and a device-related category, although other types of categories in other combinations may be used. Further, an assigned stored weight to each value associated with the metrics in the combination of the categories being used may be applied. Particular metrics known to have a higher sensitivity may be assigned a higher weight.

Once a user profile score has been calculated, then the user profile score can be compared against a set stored threshold to provide an indication if the user at the client is known client or unknown client. Next, based on the comparison and determined designation as a known client or unknown client, then an action with respect to the user at the client can be executed. A variety of different actions may be executed, such as permitting the user at the client access, denying the user at the client access, or redirecting the user at the client by way of example only.

In the following description, for the purpose of explanation, numerous specific details are set forth in order to provide a thorough understanding of examples of the technology. It will be apparent, however, that examples of the technology may be practiced without these specific details. In other instances, well-known structures and devices are shown in block diagram form in order to avoid unnecessarily obscuring examples of the technology.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other and does not imply an ordering, timing, or any characteristic of the referenced items unless otherwise specified; the terms "such as", "e.g.," "for example", and the like describe one or more examples but are not limited to the described examples(s); the term "comprises" and/or "comprising" specify the presence of stated features, but do not preclude the presence or addition of one or more other features.

A "computer system" refers to one or more computers, such as one or more physical computers, virtual computers, and/or computing devices. As an example, a computer system may be, or may include, one or more server computers, cloud-based computers, cloud-based cluster of computers, virtual machine instances or virtual machine computer elements such as virtual processors, storage and memory, data centers, storage devices, desktop computers, laptop computers, mobile devices, or any other special-purpose computing devices. Any reference to a "computer system" herein may mean one or more computers, unless expressly stated otherwise. When a computer system performs an action, the action is performed by one or more computers of the computer system.

A "client" (also referred to as a "client device") refers to a combination of integrated software components and an allocation of computational resources, such as memory, a computing device, and processes on a computing device for executing the integrated software components. The combination of the software and computational resources are configured to interact with one or more servers over a network, such as the Internet. A client may refer to either the combination of components on one or more computers, or the one or more computers.

A "server" (also referred to as a "server system", "server computer system", "server device" or "server apparatus") refers to a combination of integrated software components and an allocation of computational resources, such as memory, a computing device, and processes on the computing device for executing the integrated software components. The combination of the software and computational resources provide a particular type of function on behalf of clients of the server. A server may refer to either the combination of components on one or more computers, or the one or more computers. A server may include multiple servers; that is, a server may include a first server computing device and a second server computing device, which may provide the same or different functionality to the same or different set of clients.

Referring to FIGS. 1, an exemplary network traffic management system 100 configured to identify a device user at a client at one of the head client devices 106(1)-106(*n*) or headless client devices 108(1)-108(*n*) based on a user-related metrics analysis is illustrated. The network traffic management system 100 in this example includes a network traffic management device 102 that is coupled to server devices 104(1)-104(*n*), head client devices 106(1)-106(*n*), and headless client devices 108(1)-108(*n*) via communication network(s) 110, although network traffic management device 102, server devices 104(1)-104(*n*), head client devices 106(1)-106 (*n*) and headless client devices 108(1)-108(*n*) may be coupled together via other topologies. The network traffic management system 100 also may include other network devices which are known in the art and thus will not be described herein. This technology provides a number of advantages including methods, non-transitory computer readable media, network traffic management systems 100, and network traffic management devices 102 that enable identification of a device user based on a user-related metrics analysis.

Figure 2:
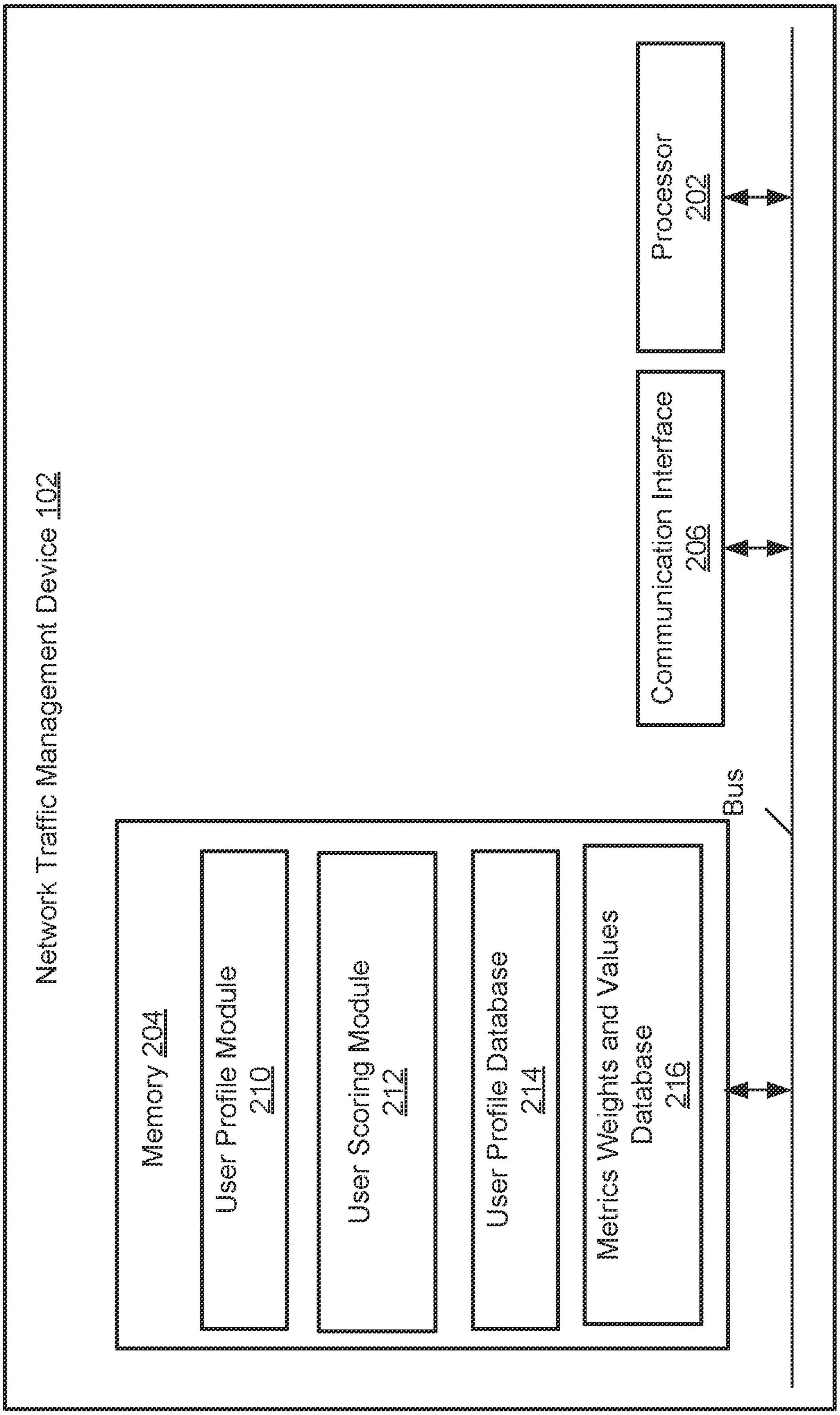
FIG. 2 is a block diagram of the exemplary network traffic management device shown in FIG. 1.

In this particular example, the network traffic management system 100 includes the network traffic management device 102, server devices 104(1)-104(*n*), head client devices 106(1)-106(*n*), and headless client devices 108(1)-108(*n*) as disclosed in FIGS. 1-2, although the system could have other types of systems, devices, and/or other elements which may be in other configurations. In some examples, one or more of the network traffic management device 102, server devices 104(1)-104(*n*), head client devices 106(1)-106(*n*), and headless client devices 108(1)-108 (*n*) or portions thereof can also be implemented in hardware and/or software within one or more other devices in the network traffic management system 100. Although the description herein is generally directed to a system that is distributed across multiple devices, it should be understood that it is contemplated that the techniques disclosed herein could alternatively be adapted for use in other manners.

Referring to FIGS. 1-2, the network traffic management device 102 of the network traffic management device system 100 may perform any number of functions, such as for example, performing an identification of a device user at one of the head client devices 106(1)-106(*n*) or one of the headless client devices 108(1)-108 (*n*) based on a user-related metrics analysis. The network traffic management device 102 in this example includes processor 202, a memory 204, and a communication interface 206, which are coupled together by a bus, although the network traffic management device 102 can include other types or numbers of elements in other configurations.

The processor 202 of the network traffic management device 102 may execute programmed instructions stored in the memory 204 of the network traffic management device 102 for any number of functions as described and illustrated by way of the examples herein. The processor 202 of the network traffic management device 102 may include one or more central processing units (CPUs) or general-purpose processors with one or more processing cores, for example, although other types of processor(s) can also be used.

The memory 204 of network traffic management device 102 stores these programmed instructions for one or more aspects of the present technology as described and illustrated herein, although some or all of the programmed instructions could be stored elsewhere. A variety of different types of memory storage devices, such as RAM, ROM, hard disk, solid state drives, flash memory, or other computer readable medium which is read from and written to by a magnetic, optical, or other reading and writing system that is coupled to the processor(s), can be used for the memory.

Accordingly, the memory of the network traffic management device 102 can store one or more modules that can include computer executable instructions that, when executed by the network traffic management device 102, cause the network traffic management 102 to perform actions, such as those described and illustrated below with reference to FIGS. 3-5. The modules can be implemented as components of other modules. Further, the modules can be implemented as applications, operating system extensions, plugins, or the like.

Even further, in some examples, the modules may be operative in a cloud-based computing environment. The modules can be executed within or as virtual machine(s) or virtual server(s) that may be managed in a cloud-based computing environment. Also, the modules, and even the network traffic management device 102 itself, may be located in virtual server(s) running in a cloud-based computing environment rather than being tied to one or more specific physical network computing devices. Also, the modules may be running in one or more VMs executing on the network traffic management device 102. Additionally, in one or more examples of this technology, virtual machine(s) running on the network traffic management device 102 may be managed or supervised by a hypervisor.

In this particular example, the memory 204 of the network traffic management device 102 includes a user profile module 210, a user scoring module 212, a user profile database 214, and a metrics weights and values database 216, although the memory can comprise other types and numbers of modules, databases, and/or other storage elements. In some examples, the user profile module 210 may include software comprising programmed instructions installed on network traffic management device 102 that can create a user profile based on stored values and other data related to metrics for a variety of categories, although other manners for creating the user profile data may be used, such as those illustrated and described by way of the examples herein. The categories may comprise in some examples combinations of a human non-touch related category, a human touch related category, an environment-related category, and a device-related category, although other types of categories and/or underlying metrics may be used, such as those illustrated and described by way of the examples herein. Additionally, in some examples, the user scoring module 212 may include software comprising programmed instructions installed on network traffic management device 102 that can calculate a user profile score based on values associated with metrics in one or more categories obtained from a retrieved user profile data, although other manners for calculating the user profile score may be used, such as those illustrated and described by way of the examples herein. In some examples, the user profile database 214 may store on network traffic management device 102 user profile data for values and assigned weights for metrics in different categories based on prior historical monitoring of the different users as illustrated and described by way of the examples herein, although the user profile data can be obtained in other manners. Further in some examples, the metrics weights and values database 216 may store on network traffic management device 102 determined values and assigned weights for metrics in different categories for different users as illustrated and described by way of the examples herein. An exemplary format of a table of categories, metrics, weights, and values which could user profile data for identifying a device user is shown in FIG. 5 by way of example only.

As shown in FIG. 1, the network traffic management device 102 may be positioned between the head client devices 106(1)-106(*n*) and also the headless client devices 108(1)-108(*n*) and the server devices 104(1)-104(*n*), such that the network traffic management device 102 can determine an identity of a user at one of the head client devices 106(1)-106(*n*) or the headless client devices 108(1)-108(*n*) before taking an action in response to a request from user at one of the head client devices 106(1)-106(*n*) or the headless client devices 108(1)-108(*n*).

The communication interface 206 of the network traffic management device 102 operatively couples and communicates between combinations of the network traffic management device 102, the head client devices 106(1)-106(*n*), the headless client devices 108(1)-108(*n*), and the server devices 104(1)-104(*n*), which are coupled together at least in part by the communication network(s) 110, although other types or numbers of communication networks or systems with other types or numbers of connections or configurations to other devices or elements can also be used.

By way of example only, the communication network(s) 110 can include local area network(s) (LAN(s)) or wide area network(s) (WAN(s)), and can use TCP/IP over Ethernet and industry-standard protocols, although other types or numbers of protocols or communication networks can be used. The communication network(s) 110 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs) hosting HyperText Transfer Protocol (HTTP), combinations thereof, and the like. The communication network(s) may also include local connections between the head client devices 106(1)-106(*n*), the headless client devices 108(1)-108(*n*), and/or the server devices 104(1)-104(*n*) and the network traffic management device 102, such as direct Wi-Fi connections, Bluetooth connections, near-field communication, direct wired connections, or any other method of the head client devices 106(1)-106(*n*), the headless client devices 108(1)-108(*n*), and/or the server devices 104(1)-104(*n*) communicating directly or indirectly with network traffic management device 102.

According to other examples, the network traffic management device 102 may be any type of computing device, such as a server device by way of example. In this example, the network traffic management device 102 is illustrated as a single device, but in other examples can comprise multiple devices, each of which has processor(s) (each processor with processing core(s)) that implement step(s) of this technology. In these examples, one or more of the devices can have a dedicated communication interface or memory. Alternatively, one or more of the devices can utilize the memory 204, communication interface 206, or other hardware or software components of one or more other of the devices included in the network traffic management device 102.

Accordingly, one or more of the devices that together comprise the network traffic management device 102 can be standalone devices or integrated with one or more other devices or apparatuses, such as one or more of the server devices 104(1)-104(*n*), for example. Moreover, one or more of the devices of the network traffic management device 102 can be in a same or a different communication network including one or more public, private, or cloud networks, for example. In yet other examples, a plurality of network traffic management devices 102 may be deployed, within and/or outside of a local area network associated with the server devices 104(1)-104(*n*), which communicate with any number of application servers or end station computers, and which have other network topologies.

Referring back to FIG. 1, the server devices 104(1)-104(*n*) of network traffic management system 100 in this example may for example be a commercial web server(s) hosting one or more associated web applications or other resources that is/are accessible by head client devices 106(1)-106(*n*) and/or the headless client devices 108(1)-108(*n*). The webpages may request web resources from any number of other domains. According to some examples, the server devices 104(1)-104(*n*) may be secure servers that are only accessible by authorized users. For example, a head client devices 106(1)-106(*n*) and/or the headless client devices 108(1)-108(*n*) requesting to access one of the server devices 104(1)-104(*n*) may first need to be identified before an action can be determined with respect to this request.

Each of the server devices 104(1)-104(*n*) includes processor(s), memory, and a communication interface, which are coupled together by a bus or other communication link (not illustrated), although other numbers or types of components other elements which can be in different configurations can be used. The server devices 104(1)-104(*n*) in this example can include application servers or database servers, for example, although other types of server devices 104(1)-104(*n*) can also be included in the network traffic management system 100.

Although the server devices 104(1)-104(*n*) are illustrated as single devices, one of the server devices 104(1)-104(*n*) in other examples may include multiple servers distributed across one or more distinct network computing devices that together server device 104. Moreover, the server devices 104(1)-104(*n*) are not limited to a particular configuration. Thus, the server devices 104(1)-104(*n*) may contain network computing devices that operate using a master/slave approach, whereby one of the network computing devices of the server devices 104(1)-104(*n*) operates to manage or otherwise coordinate operations of the other network computing devices. One of the server devices 104(1)-104(*n*) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. Accordingly, any number of network traffic management devices 102, head client devices 106(1)-106(*n*), the headless client devices 108(1)-108(*n*) and server devices 104(1)-104(*n*) may be used. The number of network traffic management devices 102, head client devices 106(1)-106(*n*), headless client devices 108(1)-108(*n*), and server devices 104(1)-104(*n*) are shown in FIG. 1 merely for purposes of providing an illustrative example.

Each of the head client devices 106(1)-106(*n*) of the network traffic management system 100 in this example includes any type of computing device that can accept direct input from users by some form of interaction with an input mechanism, such as a touchscreen, by way of example, such as a mobile, desktop, laptop, or tablet computing devices, or other computing device. Each of the headless computing devices 108(1)-108(*n*) of the network traffic management system 100 in this example includes any type of computing device that lacks any direct input, such as a wearable band device which only has sensors and no touchscreen or other buttons for user interaction. Each of the head client devices 106(1)-106(*n*) and each of the headless computing devices 108(1)-108(*n*) in this example includes a processor, memory, and a communication interface, which are coupled together by a bus or other communication link (not illustrated), although other numbers or types of components could also be used.

The head client devices 106(1)-106(*n*) and the headless computing devices 108(1)-108(*n*) may run interface applications which may provide an interface to make requests for, and receive content stored on, one or more of the server devices 104(1)-104(*n*) via the network(s) 110. The head client devices 106(1)-106(*n*) may include an input mechanism or other systems to receive inputs from the user, such as a keyboard, mouse, and/or interactive screen by way of example only. The head client devices 106(1)-106(*n*) and the headless computing devices 108(1)-108(*n*) may further include a display device, such as a display screen or touchscreen, or an input device, such as a keyboard, for example (not illustrated).

Although the exemplary network traffic management system 100 with the network traffic management device 102, the server devices 104(1)-104(*n*), the head client devices 106(1)-106(*n*), the headless computing devices 108(1)-108 (*n*), and the communication network(s) 110 are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

In some examples, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof.

The examples may also be embodied as one or more non-transitory computer readable media having executable or programmed instructions stored thereon, such as in the memory 204 of the network traffic management device 102 by way of example, for one or more aspects of the present technology, as described and illustrated by way of the examples herein. The instructions in some examples include executable code that, when executed by processor 202 of the network traffic management device 102, cause the processor 202 to carry out steps necessary to implement the methods of the examples of this technology that are described and illustrated herein.

Figure 3:
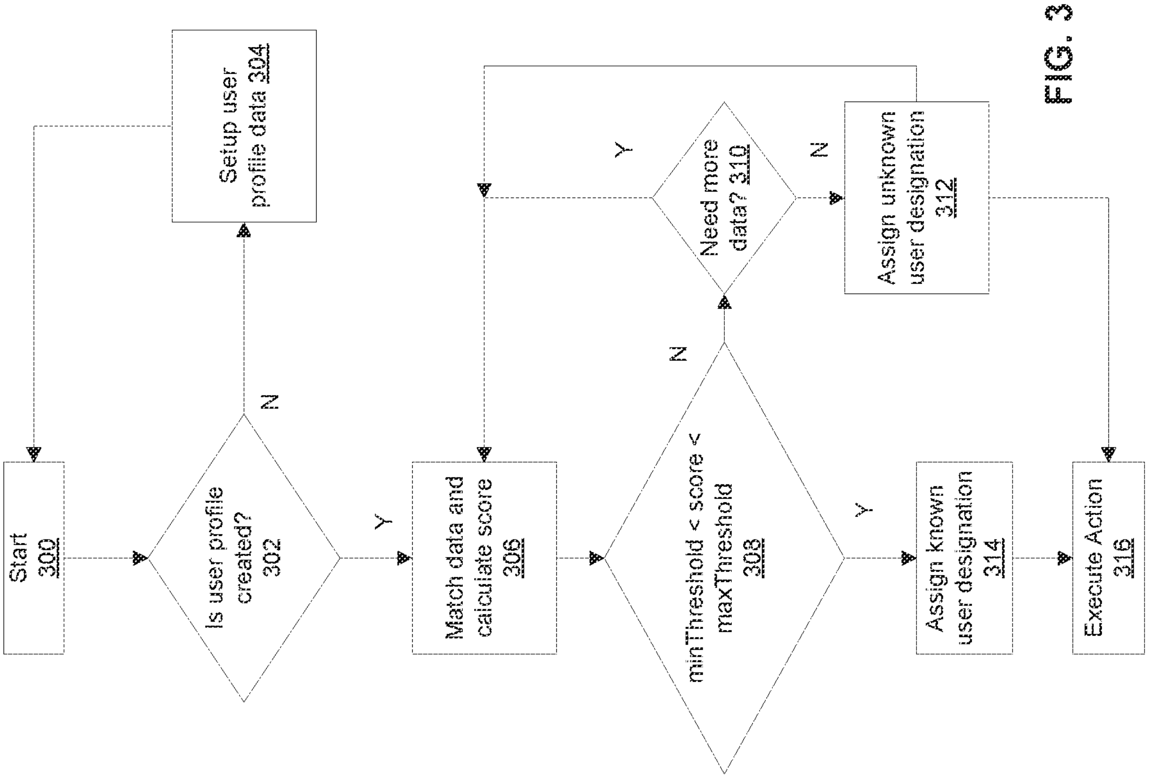
FIG. 3 is a flowchart of an exemplary method for identification of a device user at a client based on a user-related metrics analysis.

Referring to FIGS. 1-5, an example method for identifying a device user based on a user-related metrics analysis to identify and then initiate an executable action with respect to a received request is illustrated. Referring more specifically to FIG. 3, at step 300 this exemplary method starts in response to a request intercepted by the network traffic management device 102 from one of the head client devices 106(1)-106(*n*) or one of the headless computing devices 108(1)-108 (*n*) to access an applications or other resource at one of the server devices 104(1)-104 (*n*) in this example.

At step 302 the network traffic management device 102 determines if a user of the one of the head client devices 106(1)-106(*n*) or one of the headless computing devices 108(1)-108(*n*) that transmitted the request has associated user profile data stored in user profile database 214. If at step 302 the network traffic management device 102 determines that the user of the one of the head client devices 106(1)-106(*n*) or one of the headless computing devices 108(1)-108(*n*) does not have associated user profile data stored in user profile database 214 or the user profile data is incomplete, then the No branch is taken to step 304.

At step 304, the network traffic management device 102 executes user profile module 210 to acquire and setup user profile data for the user of one of the head client devices 106(1)-106(*n*) or one of the headless computing devices 108(1)-108 (*n*) as described in an example below, although the user profile data for the user can be setup or otherwise obtained in other manners. Additionally, the network traffic management device 102 can store this user profile data for the user of one of the head client devices 106(1)-106(*n*) or one of the headless computing devices 108(1)-108(*n*) in user profile database 214 in network traffic management device 102, although the user profile data can be stored in other locations.

By way of example, the network traffic management device 102 can execute the user profile module 210 to setup user profile data for the user of one of the head client devices 106(1)-106(*n*) or one of the headless computing devices 108(1)-108(*n*) by sampling and capturing data for metrics in one or more of a human non-touch related category 402(1), a human touch related category 402(2), an environment-related category 402(3), and a device-related category 402 (4) for a set prior period of time, although other types and/or numbers of categories may be used. This set period of time can be over two months prior by way of example only, although other time periods or approaches, such as a minimum number of sampled interactions, can be used. Additionally, in other examples this user profile data can be continually updated by the network traffic management device 102.

Figure 4:
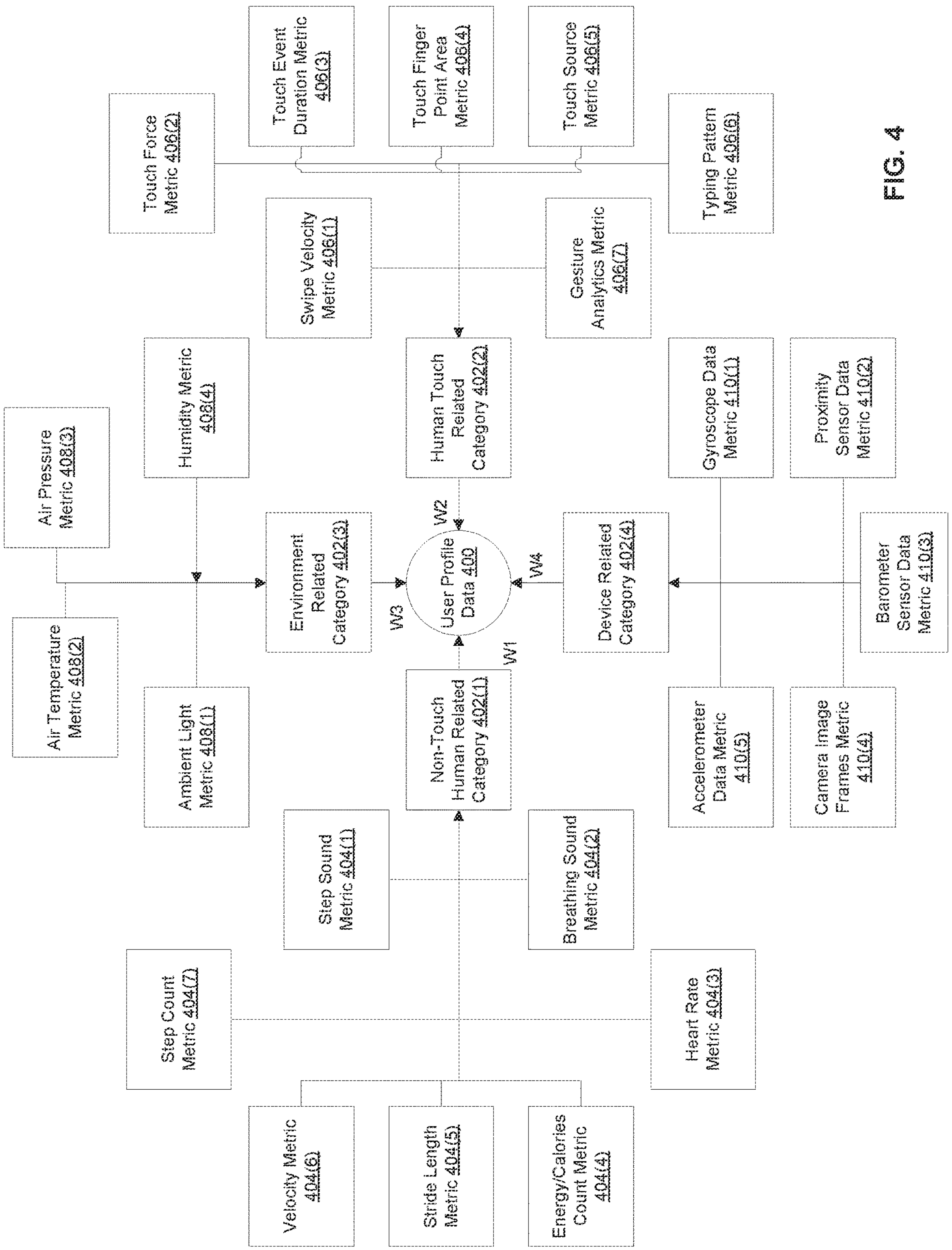
FIG. 4 is a functional block diagram of an example of combinations of different metrics groups and sub-groups used to create user profile data.

As shown by way of example in FIGS. 4-5, exemplary human non-touch related category 402(1), human touch related category 402(2), environment-related category 402 (3), and device-related category 402(4) used in creating the user profile data are illustrated. In particular, in the stored table shown in FIG. 5, the categories, metrics and corresponding short forms of the metrics, the weight applied to each of the categories, the individual weight applied to each of the metrics in each of the categories, the captured or otherwise determined value for each of the metrics is illustrated by way of example. For each of the values for each of the metrics an averaged or otherwise determined value from multiple sessions over a set period of time can be determined by the network traffic management device 102, although other manners for determining the values based on the obtained data can be used.

In this example, the human non-touch related category 402(1) comprises metrics obtained from one or more headless devices, such as a wearable band device which only has sensors and no touchscreen or other buttons for user interaction. In particular, in this example as illustrated in FIG. 4, the metrics for the human non-touch related category 402(1) can include a step sound (SS) metric 404(1) comprising a determined value for a step sound by the user, a breathing sound metric 404(2) comprising a determined value for a breathing sound by the user, a heart rate (HR) metric 404(3) comprising a determined value for a heart rate of the user, an energy/calories count (CC) metric 404(4) comprising a determined value for an energy/calories count spent by the user, a stride length metric 404(5) comprising a determined value for a stride length by the user, a velocity (V) metric 404(6) comprising a determined value for a current velocity or speed of movement by the user, and a step count (SC) metric 404(7) that captures a current step count by the user, although this category can have other types and/or numbers of other metrics.

Additionally in this example, the human touch related category 402(2) comprises metrics obtained from one or more head devices which are able to accept direct input from users by some form of interaction with an input mechanism, such as a touchscreen, by way of example. In particular, in this example the metrics for the human touch related category 402(2) can include a swipe velocity (SV) metric 406(1) comprising a determined value for a swipe velocity by the user, a touch force (TF) metric 406(2) comprising a determined value for a touch force by the user, a touch event duration (TD) metric 406(3) comprising a determined value for a touch event duration by the user, a touch finger point area (TA) metric 406(4) comprising a determined value for a touch finger point area by the user, a touch source (TS) metric 406(5) that captures a touch source by the user, such as whether the source is a finger or stylus by way of example, a typing pattern (TP) metric 406(6) comprising a determined value for a typing pattern by the user, such as typing speed, language used, vocabulary used by way of example, and a gesture analytics (GA) metric 406(7) comprising a determined value for gesture analytics of the user, such as specific gestures like pinch to zoom or where the user touches on a screen usually for a swipe gesture, distance between touch points in multi finger touch gestures like a two finger swipe down/up or more than a two finger swipe down/up by way of example, although this category can have other types and/or numbers of other metrics.

Further, in this example the environment-related category 402(3) comprises metrics obtained from one or more environmental sensing devices, such as for ambient light, air temperature, air pressure, and humidity by way of example. In particular, in this example the metrics for the environment-related category 402(3) can include a ambient light (AL) metric 408(1) comprising a determined value for ambient light around the user, an air temperature (AT) metric 408(2) comprising a determined value for air temperature around the user, an air pressure metric 408(3) comprising a determined value for air pressure (AP) around the user, and a humidity (H) metric 408(4) comprising a determined value for humidity around the user, although this category can have other types and/or numbers of other metrics.

Even further, in this example the device-related category 402(4) comprises metrics obtained from one or more sensors or imagers, such as a gyroscope, a proximity sensor, a barometer sensor, an imaging device or other camera, and an accelerometer by way of example. In particular, in this example the metrics for the device-related category 402(4) can include a gyroscope (GS) metric 410(1) comprising a determined value for gyroscopic data related to the user, a proximity sensor (PS) data metric 410(2) comprising a determined value for proximity of the user to the one of the head client devices 106(1)-106(*n*) or one of the headless computing devices 108(1)-108(*n*), a barometer sensor (BS) metric 410(3) comprising a determined value for barometric data near the user, a camera image frames (CI) metric 410(4) comprising a determined value for camera image frame data related to the user, and an accelerometer (AS) metric 410(5) comprising a determined value for accelerometer data related to the user, although this category can have other types and/or numbers of other metrics.

Accordingly and by way of example, when the user performs anything on the one of the head client devices 106(1)-106(*n*) or one of the headless computing devices 108(1)-108(*n*), for each of these sessions values for the corresponding metrics are determined or otherwise obtained and are stored as user profile data in user profile module 210 associated with stored identification information for the user, although the user profile data can be stored in other locations in other examples.

Additionally, in step 304 the network traffic management device 102 calculates baseline category scores and a baseline composite score based on the captured data for values for the different metrics in the different categories for a set period of time prior to the current received request in the user profile data for, in this example, the user of one of the head client devices 106(1)-106(*n*) or one of the headless computing devices 108(1)-108(*n*) from where the request was received. The baseline category scores and the baseline composite score can be calculated in advance by the network traffic management device 102 or can be calculated in real time based on a most recent set of stored user profile data. In particular, in this example the network traffic management device 102 calculates baseline category scores for one or more of the human non-touch related category 402(1), the human touch related category 402(2), the environment-related category 402(3), and the device-related category 402(4) (this last category is also referred to as "other" in examples herein), although other types and/or numbers of category scores can be created. The variety of different types of categories assists in more providing a more accurate identification of the current user. Once the baseline category scores for one or more of the human non-touch related category 402(1), the human touch related category 402(2), the environment-related category 402(3), and the device-related category 402(4) are calculated, then the network traffic management device 102 can calculate the baseline composite score from these calculated baseline category scores which can be used for identification of the user of one of the head client devices 106(1)-106(*n*) or one of the headless computing devices 108(1)-108(*n*) from where the request was received.

By way of example only, the network traffic management device 102 can calculate the baseline category scores and the baseline composite score with executable instructions for one or more of the human non-touch related category 402(1), the human touch related category 402(2), the environment-related category 402(3), and the device-related category 402(4) as illustrated below, although other approaches for calculating with other combinations of metrics and/or category scores can be used:

Human Non−Touch Related Category (Headless) Score $$W_{HUMAN} =$$

$$= SS + BS + HR + CC + SL + V + SC$$

$$= W_1 * \sum_{k=A}^{G} (Wk * Vk)$$

Human Touch Related Category (Head) Score $$W_{INTERACTION} =$$

$$= SV + TF + TD + TA + TS + TP + GA$$

$$= W_2 * \sum_{k=H}^{N} (Wk * Vk)$$

Environment Related Category Score $$W_{ENVIRONMENT} =$$

-continued $$= AL + AT + AP + H$$

$$= W_3 * \sum_{k=O}^{R} (Wk * Vk)$$

Device Related Score $$W_{OTHER} =$$

$$= GS + PS + BS + CI + AS$$

$$= W_4 * \sum_{k=S}^{W} (Wk * Vk)$$

$$\text{Composite Score} = \text{Human (Headless) Score} + \text{Human Touch (Head) Score} + \text{Environment Score} + \text{Other}$$

$$= W_{HUMAN} + W_{INTERACTION} + W_{ENVIRONMENT} + W_{OTHER}$$

In particular, in this example the network traffic management device 102 using the table shown in FIG. 5 can, for each of the human non-touch related category 402(1), the human touch related category 402(2), the environment-related category 402(3), and the device-related category 402(4), execute programmed instructions to determine calculated baseline category scores as well as a baseline composite score from the calculated baseline category scores for the user of the one of the head client devices 106(1)-106(*n*) or one of the headless computing devices 108(1)-108(*n*) that transmitted the request using the equations above. As shown in the examples above, the network traffic management device 102 can also apply in these calculations individual weights $W_A$-$W_W$ to obtained values $V_A$-$V_W$ for each of the metrics for each of the human non-touch related category 402(1), the human touch related category 402(2), the environment-related category 402(3), and the device-related category 402(4) and then another assigned weight $W_1$-$W_4$ to each of the calculated baseline category scores for each of the categories. The different weights $W_A$-$W_W$ and $W_1$-$W_4$ can be based on historical data that illustrated a prior success correlation to identification of the user, although other weights and/or manners for determining the scores may be used.

Referring back to step 302, if the network traffic management device 102 determines that the user of the one of the head client devices 106(1)-106(*n*) or one of the headless computing devices 108(1)-108(*n*) that transmitted the request does have associated user profile data stored in user profile database 214 in this example, then the Yes branch is taken to step 306.

At step 306 the network traffic management device 102 obtains current values for the selected exemplary metrics for one or more of the human non-touch related category 402(1), the human touch related category 402(2), the environment-related category 402(3), and the device-related category 402(4) for the user of one of the head client devices 106(1)-106(*n*) or one of the headless computing devices 108(1)-108(*n*) from where the request was received. The current values used by the network traffic management device 102 in these calculations can be in the same categories and metrics as illustrated in the table shown in FIG. 5 and can be more recent current values may be values obtained from the user profile data from a more recent set period of time earlier than the later set period of time used for calculating the baseline category scores and the baseline composite score for the user of one of the head client devices 106(1)-106(*n*) or one of the headless computing devices 108(1)-108(*n*) from where the request was received.

Next, based on these current values in the more recent set period of time the network traffic management device 102 calculates current category scores for one or more of the human non-touch related category 402(1), the human touch related category 402(2), the environment-related category 402(3), and the device-related category 402(4) based on the captured current data for the different metrics in the different categories in the same manner as illustrated and described in the examples above, although other types of calculations could be used for both as long as they are corresponding. Once the current category scores for one or more of the human non-touch related category 402(1), the human touch related category 402(2), the environment-related category 402(3), and the device-related category 402(4) are calculated, then the network traffic management device 102 can calculate a current composite score from these calculated current category scores in the same manner as illustrated and described in the examples above, although other types of calculations could be used for both as long as they are corresponding.

At step 308, the network traffic management device 102 determines if a calculated user confidence score based on the current calculated composite score and the baseline composite score for the user of the one of the head client devices 106(1)-106(*n*) or one of the headless computing devices 108(1)-108(*n*) is within a minimum and maximum threshold range, although other manners for determining confidence with a user identification can be used. By way of example, if a calculated composite baseline score is US1 and a calculated current composite score is C1, then the calculated user confidence score is calculated by the network traffic management device 102 as (C1/US1) %, although other approaches for determining this calculated user confidence score can be used. Accordingly, for use cases where C1>US1 or more specifically in an example where C1 is 94 and US1 is 85, then the calculated user confidence score for accurately identifying the actual user is (C1/US1) %=(C1/US1)*100=(94/85)*100=110.5%. In another example, for use cases where C1<US1 or more specifically in an example where C1 is 65 and US1 is 85, then the calculated user confidence score for accurately identifying the actual user is (C1/US1) %=(C1/US1)*100=(65/85)*100=76.47%. As a result, in each of these examples, the network traffic management device 102 will compare the calculated user confidence score against stored minimum and maximum confidence threshold scores, such as an 80% for the minimum confidence threshold score and a 120% maximum confidence threshold score. Thus, in these examples, the 110.5% calculated user confidence score would be within the confidence threshold range of 80% to 120%, but for the other example the 76.47% calculated user confidence score would be outside the confidence threshold range of 80% to 120%. In these example, the range helps to identify anomalies in identifying a user in either direction, e.g. not enough of a correlation or too much of a correlation indicating a possibility of an automated device mimicking the user.

Next, if at step 308 the network traffic management device 102 determines that the calculated user confidence score for the user of the one of the head client devices 106(1)-106(*n*) or one of the headless computing devices 108(1)-108 (*n*) that transmitted the request is not within a set minimum and maximum threshold range, then the No branch is taken to step 310.

At step 310, in this example the network traffic management device 102 determines if data for current values for one or metrics in one or more categories is insufficient to calculate one or more of the current category scores and additional data for values. If in step 310, the network traffic management device 102 determines data for current values for one or metrics in one or more categories is insufficient, then the Yes branch is taken back to step 306, as described earlier where more data for the current values can be obtained as needed.

If back in step 310, the network traffic management device 102 determines data for current values for one or metrics in one or more categories is sufficient to calculate one or more of the current category scores and additional data for values, then the calculated user confidence score for the user of the one of the head client devices **106(1)-106(*n*) or one of the headless computing devices 108(1)-108 (*n*) that transmitted the request was accurate and the No branch is taken back to step 312**. Accordingly, in this example this additional step ensures sufficient current data for values is available for determining the calculated user confidence score before designating the user with an unknown designation.

In this example in step 312, the network traffic management device 102 designates the user of the one of the head client devices **106(1)-106(*n*) or one of the headless computing devices 108(1)-108(*n*) that transmitted the request as unknown and can proceed back to step 306 as described earlier to monitor further. Additionally, based on the designation as a current unknown user the network traffic management device 102 can also proceed to step 316 to execute one or more actions based on this unknown designation, such as denying the request by the user of the one of the head client devices 106(1)-106(*n*) or one of the headless computing devices 108(1)-108(*n*), flagging the user of the one of the head client devices 106(1)-106(*n*) or one of the headless computing devices 108(1)-108(*n*), block traffic from the user of the one of the head client devices 106(1)-106(*n*) or one of the headless computing devices 108(1)-108(*n*), or add the user of the one of the head client devices 106(1)-106 (*n*) or one of the headless computing devices 108(1)-108(*n*)** in a separate database of unknown users by way of example only, although other types of actions can be executed to manage the network traffic.

If back at step 308 the network traffic management device 102 determines that the calculated user confidence score for the user of the one of the head client devices **106(1)-106(*n*) or one of the headless computing devices 108(1)-108 (*n*) that transmitted the request is within a set minimum and maximum threshold range, then the Yes branch is taken to step 314**.

At step 314, the network traffic management device 102 designates the user of the one of the head client devices **106(1)-106(*n*) or one of the headless computing devices 108(1)-108(*n*) that transmitted the request as known and then can proceed to step 316. At step 316, the network traffic management device 102 can execute one or more other actions based on this known designation, such as allowing the request by the user of the one of the head client devices 106(1)-106(*n*) or one of the headless computing devices 108(1)-108(*n*)** by way of example, although other types of actions can be executed to manage the network traffic.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order except as may be specified in the claims. Accordingly, the invention is limited only by the following claims and equivalents thereto.

What is claimed is:

1. A method implemented by a network traffic management system comprising one or more host devices, server devices, network traffic management devices, or client devices the method comprising:

retrieving, in response to a received request requiring identification of a client, user profile data associated with a user at the client;

calculating a user confidence score by: (i) obtaining a baseline user profile score for the user at the client based on baseline category scores calculated using prior values associated with metrics in one or more categories obtained from the retrieved user profile data, (ii) calculating a current user profile score for the user at the client based on current category scores calculated using current values associated with the metrics in the one or more categories obtained from the retrieved user profile data, and (iii) generating the user confidence score using as a ratio of the current user profile score to the baseline user profile score;

comparing the calculated user confidence score against a stored threshold range comprising minimum and maximum confidence threshold scores, wherein the maximum confidence threshold score identifies when the calculated user confidence score indicates too much of a correlation with the user; and executing an action with respect to the user at the client in response to the received request based on the comparison of the calculated user confidence score against the stored threshold range.

2. The method of claim 1 further comprising:

determining, in response to the received request requiring identification, if the user profile data associated with the user at the client has been generated; and generating the user profile data for the metrics in at least one of the categories when the determination indicates an absence of the user profile data associated with the user at the client.

3. The method of claim 1 wherein the categories comprise a human non-touch related category, a human touch related category, an environment-related category, and a device-related.

4. The method of claim 1 wherein the baseline user profile score and the current user profile score are each further determined by applying an assigned stored weight to at least one value associated with the metrics in a combination of the categories.

5. The method of claim 1 further comprises:

determining if additional data in at least one of the metrics from the retrieved user profile data is needed when the calculated user confidence score is outside the threshold range;

wherein when the determining indicates the additional data is needed, then:

obtaining the additional data;

recalculating the current user profile score based on the current values associated with the metrics in one of the categories obtained from the retrieved user profile data with the additional data;

wherein when the determining indicates the additional data is not needed, then:

identifying the user as having an unknown designation;

executing the identification action with respect to the user at the client based on the unknown designation.

6. A network traffic management device, comprising memory comprising programmed instructions stored thereon and one or more processors configured to be capable of executing the stored programmed instructions to:

retrieve, in response to a received request requiring identification of a client, user profile data associated with a user at the client;

calculate a user confidence score by: (i) obtaining a baseline user profile score for the user at the client based on baseline category scores calculated using prior values associated with metrics in one or more categories obtained from the retrieved user profile data, (ii) calculating a current user profile score for the user at the client based on current category scores calculated using current values associated with the metrics in the one or more categories obtained from the retrieved user profile data, and (iii) generating the user confidence score as a ratio of the current user profile score to the baseline user profile score;

compare the calculated user confidence score against a stored threshold range comprising minimum and maximum confidence threshold scores, wherein the maximum confidence threshold score identifies when the calculated user confidence score indicates too much of a correlation with the user; and execute an action with respect to the user at the client in response to the received request based on the comparison of the calculated user confidence score against the stored threshold range.

7. The network traffic management device of claim 6, wherein the programmed instructions are further configured to cause the one or more processors to:

determine, in response to the received request requiring identification, if the user profile data associated with the user at the client has been generated; and generate the user profile data for the metrics in at least one of the categories when the determination indicates an absence of the user profile data associated with the user at the client.

8. The network traffic management device of claim 6, wherein the categories comprise a human non-touch related category, a human touch related category, an environment-related category, and a device-related.

9. The network traffic management device of claim 6, wherein the baseline user profile score and the current user profile score are each further determined by applying an assigned stored weight to at least one value associated with the metrics in a combination of the categories.

10. The network traffic management device of claim 6, wherein the programmed instructions are further configured to cause the one or more processors to:

determine if additional data in at least one of the metrics from the retrieved user profile data is needed when the calculated user confidence score is outside the threshold range;

wherein when the determination indicates the additional data is needed, then:

obtain the additional data;

recalculate the current user profile score based on the current values associated with the metrics in one of the categories obtained from the retrieved user profile data with the additional data;

wherein when the determination indicates the additional data is not needed, then:

identify the user as having an unknown designation;

execute the identification action with respect to the user at the client based on the unknown designation.

11. A non-transitory computer readable medium having stored thereon instructions comprising executable code that, when executed by one or more processors, causes the one or more processors to:

retrieve, in response to a received request requiring identification of a client, user profile data associated with a user at the client;

calculate a user confidence score by: (i) obtaining a baseline user profile score for the user at the client based on baseline category scores calculated using prior values associated with metrics in one or more categories obtained from the retrieved user profile data, (ii) calculating a current user profile score for the user at the client based on current category scores calculated using current values associated with the metrics in the one or more categories obtained from the retrieved user profile data, and (iii) generating the user confidence score as a ratio of the current user profile score to the baseline user profile score;

compare the calculated user confidence score against a stored threshold range comprising minimum and maximum confidence threshold scores, wherein the maximum confidence threshold score identifies when the calculated user confidence score indicates too much of a correlation with the user; and execute an action with respect to the user at the client in response to the received request based on the comparison of the calculated user confidence score against the stored threshold range.

12. The non-transitory computer readable medium of claim 11, wherein the programmed instructions are further configured to cause the one or more processors to:

determine, in response to the received request requiring identification, if the user profile data associated with the user at the client has been generated; and generate the user profile data for the metrics in at least one of the categories when the determination indicates an absence of the user profile data associated with the user at the client.

13. The non-transitory computer readable medium of claim 11, wherein the categories comprise a human non-touch related category, a human touch related category, an environment-related category, and a device-related.

14. The non-transitory computer readable medium of claim 11, wherein the baseline user profile score and the current user profile score are each further determined by applying an assigned stored weight to at least one value associated with the metrics in a combination of the categories.

15. The non-transitory computer readable medium of claim 11, wherein the programmed instructions are further configured to cause the one or more processors to:

determine if additional data in at least one of the metrics from the retrieved user profile data is needed when the calculated user confidence score is outside the threshold range;

wherein when the determination indicates the additional data is needed, then:

obtain the additional data;

recalculate the current user profile score based on the current values associated with the metrics in one of the categories obtained from the retrieved user profile data with the additional data;

wherein when the determination indicates the additional data is not needed, then:

identify the user as having an unknown designation;

execute the identification action with respect to the user at the client based on the unknown designation.

16. A network traffic management system, comprising one or more server devices, network traffic management devices, or client devices with memory comprising programmed instructions stored thereon and one or more processors configured to be capable of executing the stored programmed instructions to:

retrieve, in response to a received request requiring identification of a client, user profile data associated with a user at the client;

calculate a user confidence score by: (i) obtaining a baseline user profile score for the user at the client based on baseline category scores calculated using prior values associated with metrics in one or more categories obtained from the retrieved user profile data, (ii) calculating a current user profile score for the user at the client based on current category scores calculated using current values associated with the metrics in the one or more categories obtained from the retrieved user profile data, and (iii) generating the user confidence score as a ratio of the current user profile score to the baseline user profile score;

compare the calculated user confidence score against a stored threshold range comprising minimum and maximum confidence threshold scores, wherein the maximum confidence threshold score identifies when the calculated user confidence score indicates too much of a correlation with the user; and execute an action with respect to the user at the client in response to the received request based on the comparison of the calculated user confidence score against the stored threshold range.

17. The network traffic management system of claim 16, wherein the programmed instructions are further configured to cause the one or more processors to:

determine, in response to the received request requiring identification, if the user profile data associated with the user at the client has been generated; and generate the user profile data for the metrics in at least one of the categories when the determination indicates an absence of the user profile data associated with the user at the client.

18. The network traffic management system of claim 16, wherein the categories comprise a human non-touch related category, a human touch related category, an environment-related category, and a device-related.

19. The network traffic management system of claim 16, wherein the baseline user profile score and the current user profile score are each further determined by applying an assigned stored weight to at least one value associated with the metrics in a combination of the categories.

20. The network traffic management system of claim 16, wherein the programmed instructions are further configured to cause the one or more processors to determine if additional data in at least one of the metrics from the retrieved user profile data is needed when the calculated user confidence score is outside the threshold range;

wherein when the determination indicates the additional data is needed, then:

obtain the additional data;

recalculate the current user profile score based on the current values associated with the metrics in one of the categories obtained from the retrieved user profile data with the additional data;

wherein when the determination indicates the additional data is not needed, then:

identify the user as having an unknown designation;

execute the identification action with respect to the user at the client based on the unknown designation.

* * * * *